(12) United States Patent
Tanabe et al.

(10) Patent No.: US 10,175,789 B2
(45) Date of Patent: Jan. 8, 2019

(54) DEVICE AND MEDIUM FOR DETERMINING A MOVEMENT STATE

(71) Applicant: KYOCERA Corporation, Kyoto-shi, Kyoto (JP)

(72) Inventors: Shigeki Tanabe, Yokohama (JP); Hideki Morita, Yokohama (JP); Isao Masuike, Machida (JP); Shinya Saito, Kawasaki (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 15/488,648

(22) Filed: Apr. 17, 2017

(65) Prior Publication Data

US 2017/0302783 A1    Oct. 19, 2017

(30) Foreign Application Priority Data

Apr. 18, 2016   (JP) .................................. 2016-083150

(51) Int. Cl.
| | |
|---|---|
| *H04M 3/02* | (2006.01) |
| *G06F 3/041* | (2006.01) |
| *G06F 3/0346* | (2013.01) |
| *H04W 4/02* | (2018.01) |

(52) U.S. Cl.
CPC ............ *G06F 3/041* (2013.01); *G06F 3/0346* (2013.01); *H04W 4/027* (2013.01); *H04M 2250/12* (2013.01)

(58) Field of Classification Search
None
See application file for complete search history.

(56) References Cited

U.S. PATENT DOCUMENTS

| | | | |
|---|---|---|---|
| 2013/0214925 A1* | 8/2013 | Weiss | G08B 25/001 340/539.11 |
| 2014/0080439 A1* | 3/2014 | Chun | H04W 4/22 455/404.1 |
| 2014/0276238 A1 | 9/2014 | Osorio | |
| 2015/0286285 A1* | 10/2015 | Pantelopoulos | A61B 5/6802 345/156 |
| 2016/0220153 A1* | 8/2016 | Annegarn | A61B 5/1117 |
| 2017/0011210 A1* | 1/2017 | Cheong | H04W 12/06 |

FOREIGN PATENT DOCUMENTS

| | | |
|---|---|---|
| JP | 2009-267770 A | 11/2009 |
| WO | 2015/036245 A1 | 3/2015 |

OTHER PUBLICATIONS

Extended European Search Report in EP Application No. 17166498.0, dated Aug. 23, 2017.

\* cited by examiner

*Primary Examiner* — German Viana Di Prisco
(74) *Attorney, Agent, or Firm* — Hauptman Ham, LLP

(57) ABSTRACT

A mobile device according to one aspect includes an acceleration sensor configured to detect an acceleration value, and a controller configured to determine between a moving state and a non-moving state, based on the acceleration value. The controller changes sensitivity of the acceleration sensor between the moving state and the non-moving state.

10 Claims, 3 Drawing Sheets

DEVICE AND MEDIUM FOR DETERMINING A MOVEMENT STATE

CROSS-REFERENCE TO RELATED APPLICATION(S)

The present application claims priority to and incorporates by reference the entire contents of Japanese Patent Application No. 2016-083150 filed in Japan on Apr. 18, 2016.

BACKGROUND

1. Field

The present application relates to a mobile device, a control method, and a control code.

2. Description of the Related Art

Conventionally, there has been a technique of determining the presence of moving based on an acceleration value.

SUMMARY

A mobile device according to one aspect includes an acceleration sensor configured to detect an acceleration value, and a controller configured to determine between a moving state and a non-moving state, based on the acceleration value. The controller changes sensitivity of the acceleration sensor between the moving state and the non-moving state.

A non-transitory computer readable recording medium storing thereon a control code according to one aspect causes a mobile device including an acceleration sensor that detects an acceleration value to perform the step of determining between a moving state and a non-moving state based on the acceleration value. The control code causes the mobile device to perform the step of changing sensitivity of the acceleration sensor between the moving state and the non-moving state.

A mobile device according to one aspect includes an acceleration sensor configured to detect an acceleration value, and a controller configured to determine between a moving state and a non-moving state, based on the acceleration value. The controller sets a first sensitivity of the acceleration sensor when the controller determines the moving state, and sets a second sensitivity that is different from the first sensitivity when the controller determines the non-moving state.

DETAILED DESCRIPTION

There is room for improvement with regard to the determining method in the above technique. A plurality of embodiments for carrying out a mobile device, a control method, and a control code according to the present application will be described below in detail with reference to the accompanying drawings. In the following descriptions, as an example of the mobile electronic device according to the present application, a smartphone is exemplified. In the following descriptions, like reference signs may refer to identical constituent elements. In addition, redundant descriptions may be omitted.

Figure 1:
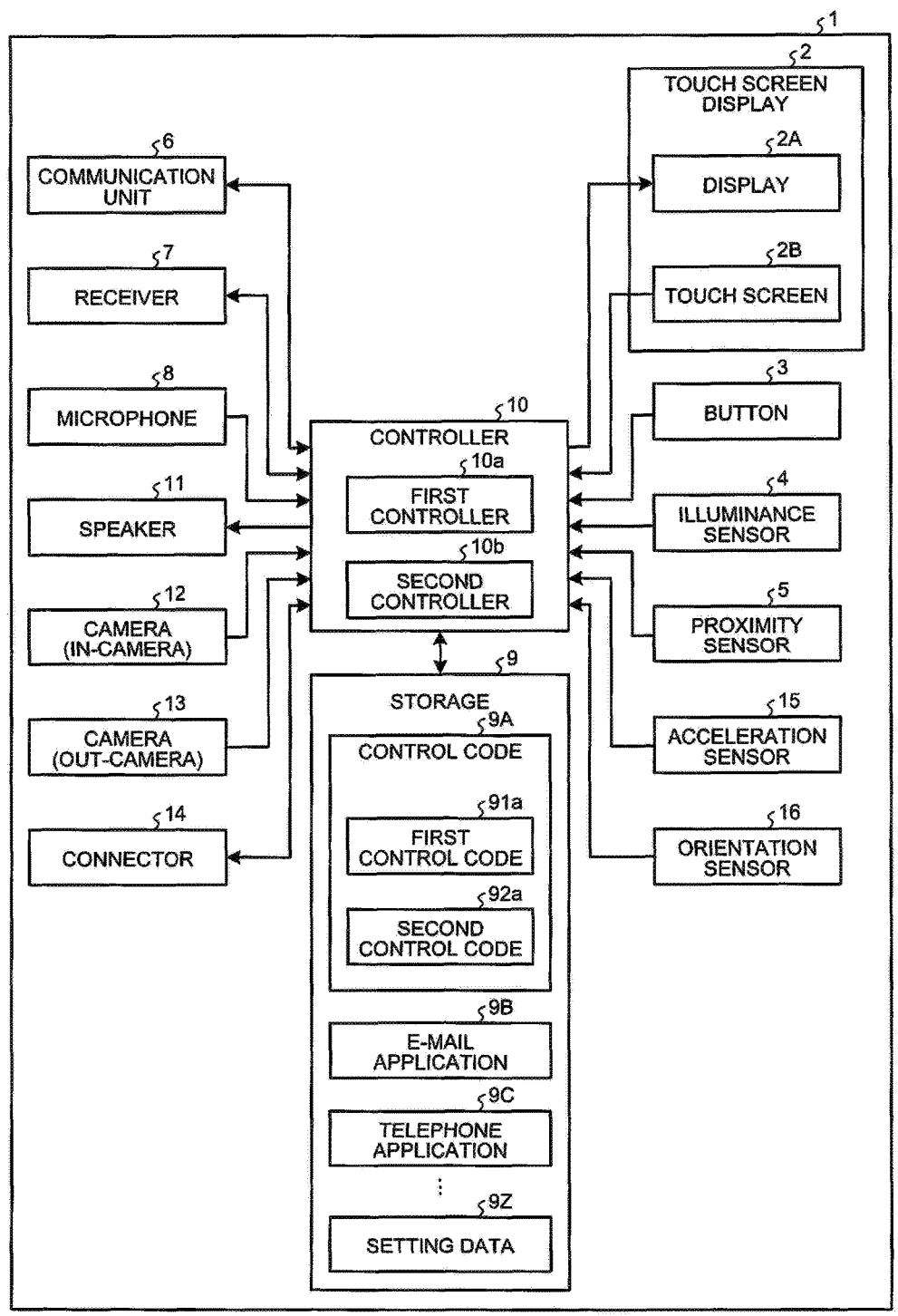
FIG. 1 is a block diagram illustrating a functional configuration of a smartphone according to an embodiment.

With reference to FIG. 1, an example of a functional configuration of a smartphone 1 according to an example of a plurality of embodiments is described. FIG. 1 is a block diagram illustrating a functional configuration of the smartphone 1.

As illustrated in FIG. 1, the smartphone 1 includes a touch screen display 2, one or plural buttons 3, an illuminance sensor 4, a proximity sensor 5, a communication unit 6, a receiver 7, a microphone 8, a storage 9, a controller 10, a speaker 11, a camera 12, a camera 13, a connector 14, an acceleration sensor 15, and an orientation sensor 16. In the following descriptions, the smartphone 1 is sometimes referred to as "own device".

The touch screen display 2 includes a display 2A and a touch screen 2B. The display 2A and the touch screen 2B can be positioned, for example, to overlap with each other, to be side by side, or to be apart from each other. When the display 2A and the touch screen 2B are positioned to overlap with each other, for example, one or plural sides of the display 2A do not need to be along with any side of the touch screen 2B.

The display 2A includes a display device such as a liquid crystal display (LCD), an organic electro-luminescence display (OELD), or an inorganic electro-luminescence display (IELD). The display 2A can display, on a screen, objects such as characters, images, signs, and figures. The screen including objects such as characters, images, signs, and figures displayed on the display 2A includes a screen referred to as "lock screen", a screen referred to as "home screen", and an application screen to be displayed during execution of an application. The home screen may be also referred to as "desktop", "standby screen", "idle screen", "standard screen", "application list screen", or "launcher screen".

The touch screen 2B can detect contact therewith or proximity thereto made with one or plural fingers, one or plural pens, one or plural stylus pens, or the like. The touch screen 2B can detect the position on the touch screen 2B when one or plural fingers, one or plural pens, one or plural stylus pens, or the like have contacted therewith or have become proximate thereto. The fingers, pens, stylus pens, and the like detected by the touch screen 2B are sometimes referred to as "finger". The position detected by the touch screen 2B where the finger has touched or become proximate is sometimes referred to as "detected position". The touch screen 2B can notify the controller 10 of the contact of the finger on the touch screen 2B along with the detected position. Operations that can be performed with the touch screen 2B can be performed with the touch screen display 2 including the touch screen 2B. In other words, operations performed with the touch screen 2B can be performed with the touch screen display 2. Operations on the touch screen 2B can be paraphrased as operations on the touch screen display 2 including the touch screen 2B. Operations on the touch screen 2B can be paraphrased as operations on the smartphone 1 including the touch screen 2B. In some embodiments, the touch screen 2B can employ, as its detection method, an electrostatic capacitance method, a resistance film method, or a load sensing method as appropriate.

The controller 10 can determine the type of gestures, based on at least one of the number of times of contact detected with the touch screen 2B, a position where contact is detected, a change of the position where the contact is detected, the length of time during which the contact is detected, a time interval between one detection of contact to another detection thereof, and the number of times of detecting contact. Operations that can be performed by the controller 10 can be performed with by a smartphone 1 including the controller 10. In other words, operations performed by the controller 10 can be performed by the smartphone 1. A gesture is an operation performed with a finger on the touch screen 2B. Operations performed on the touch screen 2B can be performed on the touch screen display 2 including the touch screen 2B. Examples of gestures determined by the controller 10 through the touch screen 2B include, but are not limited to, touch, long touch, release, swipe, tap, double tap, long tap, drag, flick, pinch-in, pinch-out, etc.

The button 3 receives operation input from a user. Upon reception of operation input from a user, the button 3 notifies the controller 10 of a fact that the button 3 has received operation input. The number of the button 3 can be either singular or plural.

The illuminance sensor 4 can detect illuminance. The illuminance is a value of a luminous flux incident on a unit area of a measuring surface of the illuminance sensor 4. The illuminance sensor 4 can be used, for example, to adjust the brightness of the display 2A.

The proximity sensor 5 can detect the presence of a neighboring object in a noncontact manner. The proximity sensor 5 detects the presence of an object based on a change of a magnetic field, a change of a feedback time of an ultrasonic reflected wave, or the like. The proximity sensor 5 can be used, for example, to detect a fact that a user's face is approximate to the display 2A. The illuminance sensor 4 and the proximity sensor 5 can be configured to be one sensor. The illuminance sensor 4 can be also used as a proximity sensor.

The communication unit 6 can perform wireless communication. The communication unit 6 supports the wireless communication standards. Examples of the wireless communication standards supported by the communication unit 6 include, but are not limited to, 2G, 3G, and 4G cellular phone communication standards, and communication standards of Near Field Communication. Examples of the cellular phone communication standards include, but are not limited to, LTE (Long Term Evolution), W-CDMA (Wideband Code Division Multiple Access), WiMAX® (Worldwide Interoperability for Microwave Access), CDMA2000, PDC (Personal Digital Cellular), GSM® (Global System for Mobile Communications), and PHS (Personal Handy-phone System). Examples of the communication standards of Near Field Communication include, but are not limited to, IEEE802.11 (IEEE is an abbreviation for The Institute of Electrical and Electronics Engineers, Inc.), Bluetooth®, IrDA (Infrared Data Association), NFC (Near Field Communication), and WPAN (Wireless Personal Area Network). Examples of the communication standards of the WPAN include, but are not limited to, ZigBee®, DECT (Digital Enhanced Cordless Telecommunications), Z-Wave, and WiSun (Wireless Smart Utility Network). The communication unit 6 can support one or plural communication standards described above.

The receiver 7 can output a sound signal transmitted from the controller 10 as sound. The receiver 7 can output, for example, sound of a motion picture reproduced by the smartphone 1, music sound, and a voice of a counterpart at the time of calling. The microphone 8 converts a voice of a user and the like into a sound signal and transmits the sound signal to the controller 10.

The storage 9 can store therein codes and data. The storage 9 can be used as a work area in which a processing result of the controller 10 is temporarily stored. The storage 9 can include a semiconductor storage medium and an arbitrary non-transitory storage medium such as a magnetic storage media. The storage 9 can include a plurality of types of storage medium. The storage 9 can include a combination of a storage medium such as a memory card, an optical disk, or a magnetooptical disk and a reader of the storage medium. The storage 9 can include a storage device to be used as a temporary storage area such as a RAM (Random Access Memory).

The codes stored in the storage 9 include an application executed in a foreground or a background, and a basic code that supports operations of the application. An application screen is displayed on the display 2A, for example, when the application is executed in a foreground. The basic code includes an OS, for example. The application and the basic code can be installed in the storage 9 through wireless communication via the communication unit 6 or via a non-transitory storage medium.

The storage 9 can store therein a control code 9A, an e-mail application 9B, a telephone application 9C, setting data 9Z and the like.

The control code 9A provides a function related to various types of control for operating the smartphone 1. In the embodiments, the control code 9A includes a first control code 91a and a second control code 92a.

The first control code 91a can provide a function of determining between a state in which the own device is moving and a state in which the own device is not moving, based on an acceleration value. The state in which the own device is moving includes a state in which a user who carries the own device is moving. The state in which the own device is not moving includes a state in which a user who carries the own device is not moving. The first control code 91a can provide a function of determining by which means, among a plurality of moving means, the own device is moving as the state in which the own device is moving. The plurality of moving means include walking, running, bicycle, and train.

The second control code 92a can provide a function of changing the sensitivity of the acceleration sensor 15 (hereinafter, "measurement range") between the state in which the own device is moving and the state in which the own device is not moving. As the measurement range of the acceleration sensor 15, for example, ±2 g (gravitational acceleration), ±4 g, ±8 g, and ±16 g are provided. These measurement ranges are only examples, and are not limited thereto. When it is determined that the own device is in a moving state, the second control code 92a can provide a function of changing the measurement range of the acceleration sensor 15 to a different measurement range in at least two of the moving means. The at least two moving means include bicycle and walking. In the embodiments, when it is determined that the moving means of the own device is bicycle or walking, the second control code 92a changes the measurement range of the acceleration sensor 15 to the maximum ±16 g. If the measurement range of the acceleration sensor 15 before the change is ±4 g, the second control code 92a changes the measurement range of the acceleration sensor 15 from ±4 g to ±16. When it is determined that the moving means of the own device is other than the bicycle and walking, the second control code 92a can return the measurement range of the acceleration sensor 15 to the set value before the change. If the measurement range of the acceleration sensor 15 before the change is ±4 g, the second control code 92a changes the measurement range of the acceleration sensor 15 from ±16 g to ±4 g. When it is determined that the moving means of the own device is other than the bicycle and walking, the second control code 92a can change the measurement range of the acceleration sensor 15 to other set values. For example, when it is determined that the moving means of the own device is train, the second control code 92a can change the measurement range of the acceleration sensor 15 to the minimum ±2 g. The measurement range changed by the second control code 92a is not limited to this example.

The e-mail application 9B can provide an e-mail function for composition, transmission, reception, display, and the like of an e-mail. The telephone application 9C can provide a call function for calling via wireless communication.

The setting data 9Z is configured to include various types of data to be used for processing performed based on the functions provided by the control code 9A and the like. The setting data 9Z includes information for determining whether the own device is in a moving state. The setting data 9Z includes information for determining the moving means of the own device, when the own device is in a moving state. The information for determining whether the own device is in a moving state and the information for determining the moving means of the own device can include the direction and magnitude of acceleration acting on the smartphone 1, or an acceleration pattern configured by a time series variation of the direction and magnitude of acceleration.

The controller 10 can integrally control the operations of the smartphone 1 to realize various types of functions. The controller 10 includes an arithmetic processor. Examples of the arithmetic processor can include, but are not limited to, a CPU (Central Processing Unit), an SoC (System-on-a-Chip), an MCU (Micro Control Unit), an FPGA (Field-Programmable Gate Array), and a coprocessor. The SoC can be integrated with other constituent elements such as the communication unit 6. The controller 10 is an example of a controller.

Specifically, the controller 10 executes commands included in the code stored in the storage 9, while referring to the data stored in the storage 9 as required. The controller 10 controls a functional unit according to the data and the commands, thereby realizing the various types of functions. Examples of the functional unit include, but are not limited to, at least one of the display 2A, the communication unit 6, the microphone 8, the speaker 11, and the orientation sensor 16. The controller 10 may change the control according to a detection result of a detector. Examples of the detector include, but are not limited to, at least the touch screen 2B, the button 3, the illuminance sensor 4, the proximity sensor 5, the microphone 8, the camera 12, the camera 13, the acceleration sensor 15, and the orientation sensor 16.

The controller 10 executes the control code 9A to realize the processes described below in cooperation with the acceleration sensor 15. The controller 10 includes a first controller 10a and a second controller 10b. The first controller 10a executes the first control code 91a to realize the process of determining between the state in which the own device is moving and the state in which the own device is not moving, based on the detection result of the acceleration sensor 15. The second controller 10b executes the second control code 92a to realize the process of changing the measurement range of the acceleration sensor 15 between the state in which the own device is moving and the state in which the own device is not moving. In the state in which the own device is moving, the second controller 10b can realize the process of changing the measurement range of the acceleration sensor 15 to a different measurement range in at least two of the moving means, by executing the second control code 92a. For example, when the own device is moving by walking or by bicycle, the second controller 10b can perform the process of changing the measurement range of the acceleration sensor 15 to the maximum range. The first controller 10a and the second controller 10b can be physically dispersed or physically integrated. The first controller 10a and the second controller 10b can be dispersed functionally, while being integrated physically.

The speaker 11 can output a sound signal transmitted from the controller 10 as sound. The speaker 11 can output, for example, ringtones and music. One of the receiver 7 and the speaker 11 can also execute functions of the other one.

The camera 12 and the camera 13 can convert a shot image into an electric signal. The camera 12 can be an in-camera that shoots an object facing the display 2A. The camera 13 can be an out-camera that shoots an object facing an opposite surface of the display 2A. The camera 12 and the camera 13 can be mounted on the smartphone 1 in a state of being functionally and physically integrated, as a camera unit that can be used by switching the in-camera and the out-camera.

The connector 14 includes a terminal to which other devices are connected. The connector 14 can include a general-purpose terminal such as a USB (Universal Serial Bus), an HDMI® (High-Definition Multimedia Interface), Light Peak)(Thunderbolt®, and an earphone/microphone connector. The connector 14 can be a dedicated terminal such as a Dock connector. Examples of the devices connected to the connector 14 include, but are not limited to, an external storage, a speaker, and a communication device.

The acceleration sensor 15 can detect the direction and magnitude of acceleration (acceleration value) acting on the smartphone 1. The acceleration sensor 15 has a plurality of measurement ranges at the time of detecting the acceleration value. The controller 10 can determine a state in which a user of the smartphone 1 is moving based on the direction and magnitude of acceleration detected by the acceleration sensor 15 or the acceleration pattern including the time series variation of the direction and magnitude of acceleration. The controller 10 executes the control code 9A, thereby enabling to determine the moving means of the smartphone 1. The controller 10 can determine to which means of walking, running, bicycle, and train the moving means of the user the own device corresponds, by determining whether each of the direction and magnitude of acceleration matches with the information included in the setting data 9Z under a predetermined degree of certainty. The controller 10 can determine the state in which the user of the smartphone 1 is not moving, based on the direction and magnitude of acceleration detected by the acceleration sensor 15 or the acceleration pattern including the time series variation of the direction and magnitude of acceleration. When it is determined that the user of the smartphone 1 is not moving, the controller 10 can determine whether the state corresponds to which of a state in which the user carrying the own device is stopping, a state in which the own device is held by the user, or a state in which the own device is placed, by determining whether each of the direction and magnitude of acceleration matches with the information included in the setting data 9Z under a predetermined degree of certainty. Each of the direction and magnitude of acceleration detected by the acceleration sensor 15 is only an example of the information for realizing determining of the moving state of the own device and the moving means, and are not limited thereto.

The orientation sensor 16 can measure the direction (orientation) of the smartphone 1 by measuring geomagnetism, for example. The orientation sensor 16 can be any of a biaxial type or a triaxial type. The orientation sensor 16 can measure the direction and magnitude of a magnetic field.

The controller 10 can use respective outputs from the acceleration sensor 15 and the orientation sensor 16 in combination. By using the respective outputs from the acceleration sensor 15 and the orientation sensor 16 in combination, the smartphone 1 can execute control that accurately reflects the movement of the own device by the controller 10. The acceleration sensor 15 and the orientation sensor 16 can be used as one motion sensor.

The smartphone 1 can include a GPS receiver and a vibrator in addition to the respective functional units described above. The GPS receiver can receive a radio signal of a predetermined frequency band from a GPS satellite. The GPS receiver performs demodulation processing on the received radio signal and transmits the processed signal to the controller 10. The GPS receiver supports arithmetic processing of the current position of the smartphone 1. The vibrator vibrates a part or the whole of the smartphone 1. In order to generate vibrations, the vibrator includes, for example, a piezoelectric device or an eccentric motor. The smartphone 1 includes a functional unit inevitably used to maintain the functions of the smartphone 1 such as a battery, and a controller inevitably used to realize the control of the smartphone 1.

Figure 2:
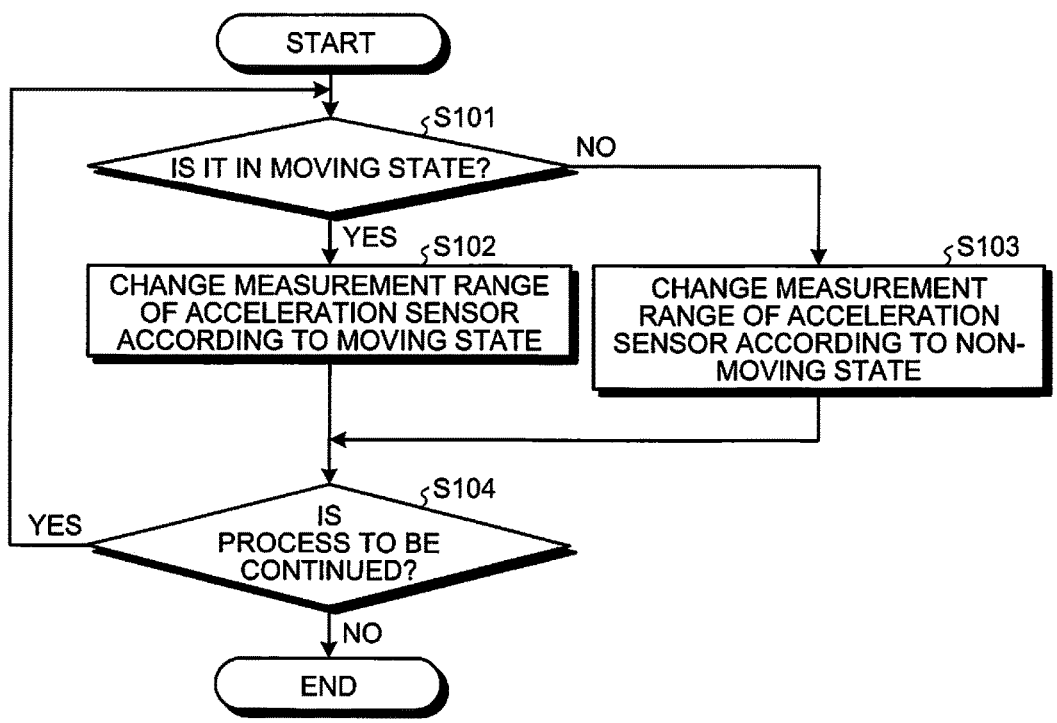
FIG. 2 is a flowchart illustrating an example of processes performed by the smartphone according to the embodiment.
Figure 3:
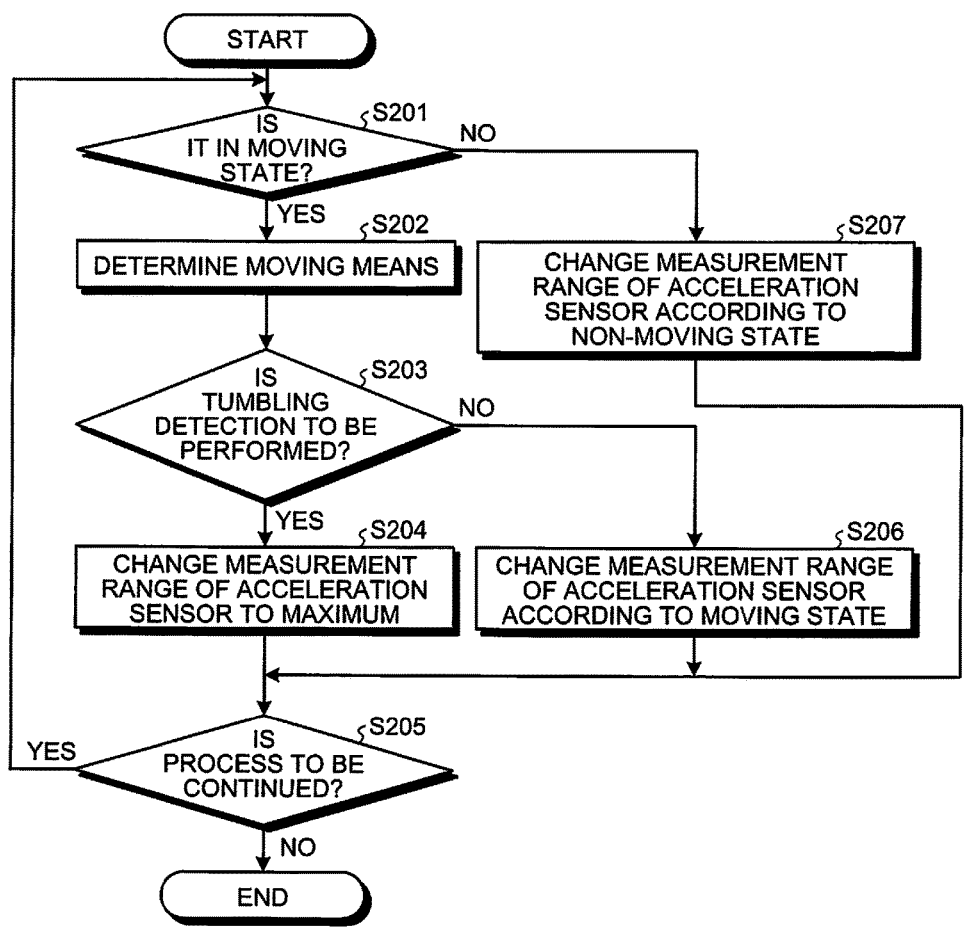
FIG. 3 is a flowchart illustrating an example of processes performed by the smartphone according to the embodiment.

Examples of a process performed by the smartphone 1 according to the embodiments are described with reference to FIG. 2 and FIG. 3. FIG. 2 and FIG. 3 are flowcharts illustrating examples of the process performed by the smartphone 1. The processes illustrated in FIG. 2 and FIG. 3 are realized when the controller 10 executes the control code 9A stored in the storage 9.

An example of a flow of a process performed by the smartphone 1 is described with reference to FIG. 2. As illustrated in FIG. 2, the controller 10 determines whether the own device is in a moving state based on an acceleration value detected by the acceleration sensor 15 (Step S101).

As a result of the determination, when the own device is in a moving state (Yes at Step S101), the controller 10 changes the measurement range of the acceleration sensor 15 according to the moving state (Step S102).

On the other hand, as a result of the determination, when the own device is in a non-moving state (No at Step S101), the controller 10 changes the measurement range of the acceleration sensor 15 according to the non-moving state (Step S103). For example, the controller 10 changes the measurement range of the acceleration sensor 15 according to the state determined as the non-moving state. The controller 10 can change the measurement range of the acceleration sensor 15 to one predetermined measurement range, even in a moving state or in a non-moving state, instead of Step S103.

Subsequently, the controller 10 determines whether the process is continued (Step S104).

As a result of the determination, when the process is continued (Yes at Step S104), the controller 10 returns to the process procedure at Step S101.

On the other hand, as a result of the determination, when the process is not continued (No at Step S104), the controller 10 finishes the process illustrated in FIG. 2.

Another example of the flow of the process performed by the smartphone 1 is described with reference to FIG. 3. As illustrated in FIG. 3, the controller 10 determines whether the own device is in a moving state based on an acceleration value detected by the acceleration sensor 15 (Step S201).

As a result of the determination, when the own device is in a moving state (Yes at Step S201), the controller 10 determines the moving means (Step S202).

Subsequently, the controller 10 determines whether tumbling detection based on the moving means is performed (Step S203). For example, when the moving means corresponds to bicycle or walking, the controller 10 derives a determination result of performing the tumbling detection.

As a result of the determination, when the tumbling detection is to be performed (Yes at Step S203), the controller 10 changes the measurement range of the acceleration sensor 15 to the maximum (Step S204).

Subsequently, the controller 10 determines whether the process is continued (Step S205).

As a result of the determination, when the process is continued (Yes at Step S205), the controller 10 returns to the process procedure at Step S201 described above.

On the other hand, as a result of the determination, when the process is not continued (No at Step S205), the controller 10 finishes the process illustrated in FIG. 3.

At Step S203 described above, as a result of the determination, when the tumbling detection is not to be performed (No at Step S203), the controller 10 changes the measurement range of the acceleration sensor 15 according to the moving state (Step S206), and proceeds to the process procedure at Step S205 described above.

At Step S201, as a result of the determination, when the own device is not in a moving state (No at Step S201), the controller 10 changes the measurement range of the acceleration sensor 15 according to the non-moving state (Step S207), and proceeds to the process procedure at Step S205 described above.

In the embodiments described above, for example, when the own device is in a moving state and the moving means corresponds to bicycle or walking, the smartphone 1 can set the measurement range of the acceleration sensor 15 to the maximum range in order to perform the tumbling detection of a user of the own device. Therefore, according to the embodiments described above, tumbling of the user of the smartphone 1 can be detected.

In the embodiments described above, the smartphone 1 can notify the detection of tumbling to a preset contact address in response to the detection of tumbling. For example, the smartphone 1 can transmit a message of notifying the detection of tumbling to a preset e-mail address.

The processes illustrated in FIG. 2 and FIG. 3 can be also applied to various types of electronic devices having an acceleration sensor mounted thereon, other than the smartphone 1.

Characteristic embodiments have been described above in order to disclose the techniques according to the appended claims in a complete and clear manner. However, the appended claims should not be limited by the above embodiments, and should be embodied by full range of modifications and replaceable configurations that can be conceived by persons skilled in the art, within the scope of fundamental features described in the present specification.

In the embodiments described above, it is determined whether the controller 10 performs the tumbling detection based on the moving means. However, this determination can be omitted. When the determination is to be omitted, the controller 10 changes the measurement range of the acceleration sensor 15 to the maximum range, when the moving means corresponds to bicycle or walking, for example, as the measurement range of the acceleration sensor 15 corresponding to the moving state.

What is claimed is:

1. A mobile device comprising:
an acceleration sensor configured to detect an acceleration value; and
a controller configured to determine between a moving state and a non-moving state, based on the acceleration value,
wherein
the controller is configured to change a measurement range of the acceleration sensor between the moving state and the non-moving state, and
the controller is configured to:
change the measurement range of the acceleration sensor to maximum based on a determination that the moving means corresponds to walking, and
change the measurement range of the acceleration sensor to maximum based on a determination that the moving means corresponds to bicycling.

2. The mobile device according to claim 1, wherein the controller includes
a first controller configured to determine between a moving state and a non-moving state based on the acceleration value, and
a second controller configured to change the measurement range of the acceleration sensor between the moving state and the non-moving state.

3. The mobile device according to claim 1, wherein the controller determines by which means of a plurality of moving means the mobile device is moving, as the moving state, and
changes the measurement range of the acceleration sensor to a different measurement range in at least two of the plurality of moving means.

4. The mobile device according to claim 1, wherein the controller sets the measurement range of the acceleration sensor to maximum range to perform tumbling detection of a user of the mobile device when the moving means corresponds to walking or bicycling.

5. The mobile device according to claim 1, wherein the controller notifies the detection of tumbling to a preset contact address in response to the detection of tumbling.

6. The mobile device according to claim 1, wherein the controller is configured to change the measurement range of the acceleration sensor to less than maximum based on a determination that the moving means is other than walking and bicycling.

7. A non-transitory computer readable recording medium storing thereon a control code that causes a mobile device including an acceleration sensor that detects an acceleration value to perform the steps of:
determining between a moving state and a non-moving state based on the acceleration value;
changing a measurement range of the acceleration sensor between the moving state and the non-moving state,
changing the measurement range of the acceleration sensor to maximum based on a determination that the moving means corresponds to walking, and
changing the measurement range of the acceleration sensor to maximum based on a determination that the moving means corresponds to bicycling.

8. The non-transitory computer readable recording medium according to claim 7, wherein the control code causes the mobile device to perform the step of:
changing the measurement range of the acceleration sensor to less than maximum based on a determination that the moving means is other than walking and bicycling.

9. A mobile device comprising:
an acceleration sensor configured to detect an acceleration value; and
a controller configured to determine between a moving state and a non-moving state, based on the acceleration value,
wherein
the controller sets a first measurement range of the acceleration sensor when the controller determines the moving state,
the controller sets a second measurement range that is different from the first measurement range when the controller determines the non-moving state,
the controller is configured to change the measurement range of the acceleration sensor to maximum based on a determination that the moving means corresponds to walking, and
the controller is configured to change the measurement range of the acceleration sensor to maximum based on a determination that the moving means corresponds to bicycling.

10. The mobile device according to claim 9, wherein the controller is configured to change the measurement range of the acceleration sensor to less than maximum based on a determination that the moving means is other than walking and bicycling.

* * * * *